United States Patent [19]
Mori

[11] 3,734,593
[45] May 22, 1973

[54] PLURAL-MICROSCOPE WITH LIGHT INDICATOR

[75] Inventor: Iwao Mori, Kanagawaken, Japan

[73] Assignee: Sony Corporation, Tokyo, Japan

[22] Filed: June 7, 1971

[21] Appl. No.: 150,567

[30] Foreign Application Priority Data

June 12, 1970 Japan ............................... 45/58352

[52] U.S. Cl. .................... 350/31, 350/36, 350/81, 350/84, 350/85, 353/42
[51] Int. Cl. ............................................. G02b 21/22
[58] Field of Search .................... 350/35, 36, 10, 91, 350/81, 31, 32, 84, 85; 353/42, 43, 11

[56] References Cited

UNITED STATES PATENTS

| | | |
|---|---|---|
| 3,661,316 | 5/1972 | Kulicke et al. ..................... 350/81 X |
| 3,582,178 | 6/1971 | Boughton et al. ..................... 350/10 |
| 3,183,773 | 5/1965 | Weinstein ............................ 353/42 |
| 3,186,300 | 6/1965 | Littmann .......................... 350/36 X |
| 2,495,296 | 1/1950 | Springer ........................... 353/11 X |
| 2,528,681 | 11/1950 | Berssenbrugge .................... 353/42 X |
| 2,717,530 | 9/1955 | Morphis et al. ...................... 353/42 |
| 2,826,114 | 3/1958 | Bryan ................................. 350/36 |

Primary Examiner—David H. Rubin
Attorney—Lewis H. Eslinger, Alvin Sinderbrand and Curtis, Morris & Safford

[57] ABSTRACT

A plural-microscope, preferably having two stereoscopic microscopes, is further provided with a light indicator for projecting onto a specimen supported by the stage a light spot which is substantially smaller than the field of view of each microscope, and the light indicator and stage are made movable relative to each other for varying the position of the light spot on the specimen so that the light spot can be used to identify a selected portion of a specimen to be viewed simultaneously by the microscopes.

7 Claims, 4 Drawing Figures

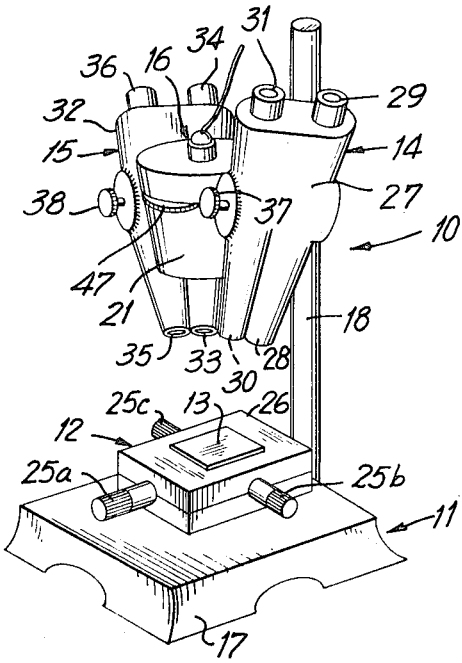
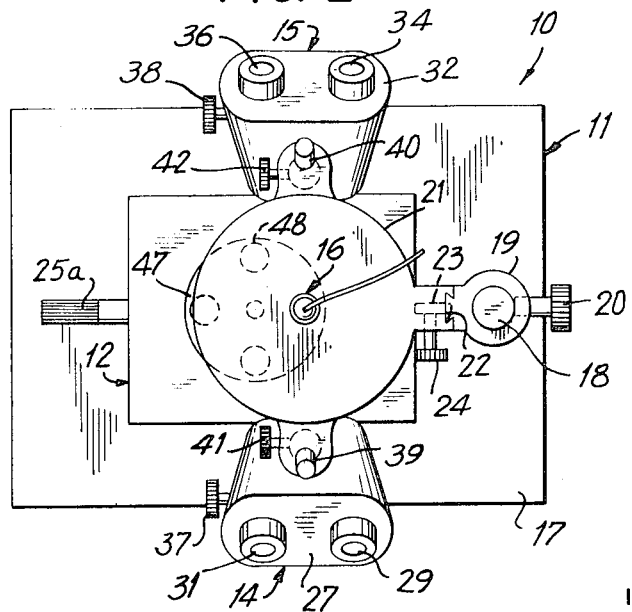

PLURAL-MICROSCOPE WITH LIGHT INDICATOR

This invention relates generally to microscopes, and more particularly is directed to improvements in plural- or double-microscopes with which two or more observers may simultaneously view a specimen or object.

Double-microscopes have been proposed, for example, as disclosed in U.S. Pat. Nos. 3,170,983, 3,186,300 and 3,402,976, to permit two observers to simultaneously view a single specimen or object. It has further been proposed that the two microscopes of such instruments be stereoscopic microscopes to permit the binocular viewing of the specimen by each observer. Instruments of the described type have been proposed for use in surgery, or for use in the manufacture and inspection of miniaturized industrial products, such as, semiconductor devices, or in the training or instructing of personnel with respect to operations to be performed on miniaturized devices. With the previously proposed double-microscopes, a surgeon or instructor can perform desired operations on a specimen or object while viewing the same through one of the microscopes, and an assisting surgeon, student or trainee can view the specimen or object being operated upon through the other microscope. Instruments of the described type usually include an arrangement for illuminating the fields of view of both microscopes so that such field of view is brightly and uniformly illuminated for both observers. However, with the existing instruments of the described type, one of the observers, for example, an instructor, cannot conveniently point out or indicate to the other observer, such as, a student or trainee, a particular point or part of the specimen or object being simultaneously viewed by both observers, and thus difficulty is experienced in imparting instruction or information with respect to the viewed specimen or object.

Accordingly, it is an object of this invention to provide a plural-microscope, preferably having at least two stereoscopic microscopes, and which is further provided with an indicator by which a spot of light can be projected onto the viewed specimen or object for use as an indicator or pointer in making reference to a particular part of the specimen or object that is simultaneously viewed by two or more observers.

More particularly, it is an object of this invention to provide a plural-microscope with a light indicator for projecting onto a specimen or object supported by the stage a light spot which is substantially smaller than the field of view of each microscope, with the light indicator and stage being movable relative to each other for varying the position of the light spot on the specimen so that the light spot can be used to identify or point to a selected portion of the specimen to be viewed simultaneously through the microscopes.

Still another object is to provide a plural-microscope, as aforesaid, in which the light indicator for projecting a light spot on the specimen or object includes color filter means to impart a selected color to the light spot so that the latter can be readily distinguished from the overall illumination of the specimen or from the color of the particular portion of the specimen that is being pointed to or indicated by the light spot.

The above, and other objects, features and advantages of this invention, will be apparent in the following detailed description of an illustrative embodiment thereof which is to be read in connection with the accompanying drawing, wherein:

FIG. 1 is a perspective view of a double-stereoscopic microscope in accordance with an embodiment of this invention;

FIG. 2 is a top plan view of the instrument shown on FIG. 1; and

Figure 3:
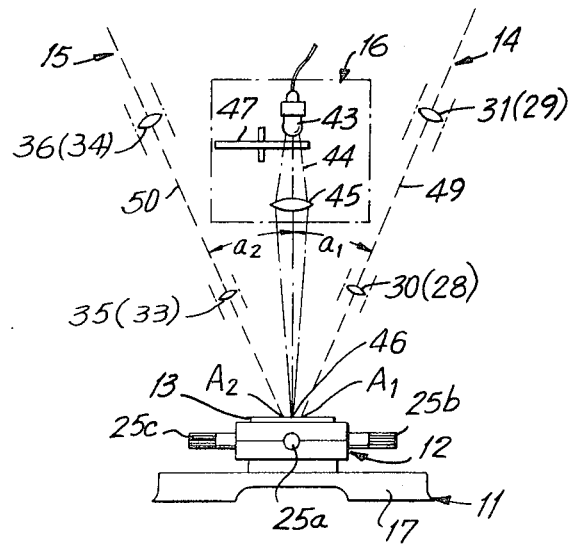
FIGS. 3 and 4 are diagrammatic, front elevational views of the instrument of FIGS. 1 and 2, and which are shown with the individual stereomicroscopes adjusted relative to each other so as to have different fields of view and coincident fields of view, respectively.

Referring to the drawing in detail, and initially to FIGS. 1 and 2 thereof, it will be seen that a plural-microscope 10 according to this invention, as there shown, generally comprises a stand 11, a stage 12 carried by stand 11 for supporting a specimen or object 13 to be viewed, two microscopes 14 and 15 mounted on stand 11 for the simultaneous viewing of specimen or object 13 on stage 12, and a light indicator assembly 16 also mounted on stand 11, preferably between microscopes 14 and 15, and being operative to project onto stage 12 a spot of light which is substantially smaller than the field of view of each of microscopes 14 and 15, with such light spot and the stage being relatively movable so that the light spot can be projected on any desired point or portion of the specimen or object 13 for pointing out or identifying that selected portion of the specimen to be viewed simultaneously with microscope 14 and 15.

As shown, stand 11 includes a base 17 adapted to rest upon a table or other supporting surface, a post 18 extending vertically upward at the back portion of base 17 and having a sleeve 19 slidable on post 18 and being locked in position relative to the latter by a set screw 20, and a body or head 21 which is connected to sleeve 19 so as to extend forwardly from post 18 in overlying relationship to stage 12. In the embodiment shown, a dove-tailed spline and groove connection 22 is provided between body 21 and sleeve 19 and a gear 23 is recessed in body 21 for meshing engagement with a rack (not shown) on sleeve 19 and is driven by a knob 24 so as to effect fine vertical adjustment of the body or head 21 relative to sleeve 19, while the body or head is roughly positioned at the desired elevation by movement of sleeve 19 along post 18.

The stage 12 is shown to be in the form of a conventional manipulator having three manually rotatable screws 25a, 25b and 25c by which a top portion 26 of the stage adapted to have the specimen 13 rest thereon can be selectively moved in three orthogonally related directions, for example, vertically and horizontally in the fore and aft directions and in the opposite lateral directions.

The two microscopes 14 and 15 are shown to be of the stereoscopic type, that is, arranged to permit binocular viewing of the specimen or object 13 with a stereoscopic effect. Accordingly, microscope 14 comprises a casing 27 that contains a lens system for the right eye including an objective lens system 28 and an ocular or eyepiece 29 and a lens system for the left eye that includes an objective lens system 30 and an ocular or eyepiece 31. Similarly, the other stereoscopic microscope 15 includes a casing 32 containing an objective lens system 33 and ocular 34 for the left eye and an objective lens system 35 and ocular 36 for the right eye. The microscopes 14 and 15 may be further provided, as shown, with knob actuated adjusters 37 and 38, respectively, for adjusting the length of focus of the left-eye lens system of microscope 14 and the length of focus of the right-eye lens system of microscope 15, respectively. Further, if desired, the distance between the oculars or eyepieces 29 and 31 and between the eyepieces 34 and 36 may be made adjustable in a conventional manner.

The microscopes 14 and 15 are shown to have their casings 27 and 32, respectively, mounted, in an articulated manner, at opposite sides of body or head 21, for example, by ball and socket joints 39 and 40, respectively, and set screws 41 and 42 are provided (FIG. 2) for locking the joints 39 and 40, respectively, and thereby fixing the casings 27 and 32 relative to body 21.

Figure 4:
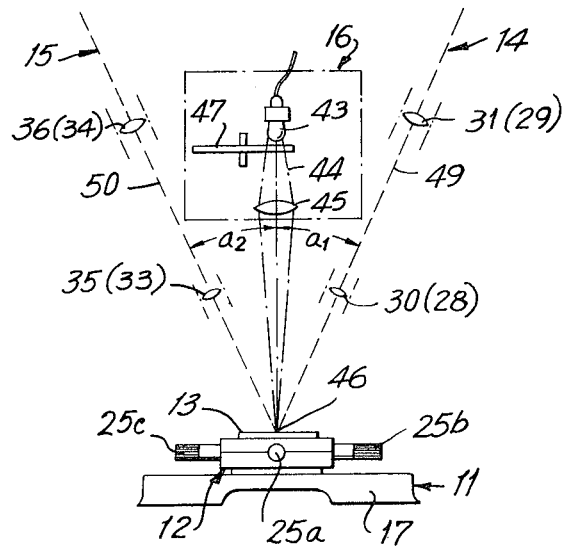

The light indicator assembly 16 of the illustrated embodiment is shown to be mounted in body or head 21 and to comprise a light source or lamp 43 for projecting a light beam 44 downwardly toward the stage 12 and a condenser lens system 45 interposed in the path of light beam 44 to converge the light rays of such beam into a small light spot 46 (FIGS. 3 and 4) of a size very substantially smaller than the field of view of each of microscopes 14 and 15. The light indicator assembly 16 provided according to this invention further preferably includes color filter means for imparting a selected color to the light spot 46. In the illustrated embodiment, such color filter means includes a disk 47 which is rotatably mounted in body 21 and has its periphery projecting outwardly through a slot provided at the front of body 21 so that disk 47 can be manually rotated. The disk 47 has a number of circular openings 48 (FIG. 2) at locations spaced apart around the disk, and each of the openings 48 may contain a filter of a desired color. The openings 48 are selectively positioned in alignment with beam 44 in response to suitable rotation of disk 47 whereby to impart a corresponding color to the light of beam 44 and to the spot 46 produced by the light beam on stage 12. The filter interposed in the path of light beam 44 is selected so that the color of spot 46 will provide a ready contrast relative to the ambient or overall illumination of the specimen 13 on stage 12, and also with respect to any portion of the specimen on which the spot 46 may be selected to land.

In addition to the above described light indicator assembly 16, the plural-microscope 10 according to this invention may have conventional illuminating devices (not shown) for providing adequate overall illumination of the images of the fields of view of microscopes 14 and 15.

The plural-microscope 10 according to this invention can be used to permit a specimen or object 13 to be viewed simultaneously by two observers, or to permit the viewing of the specimen 13 from two different positions. In using the plural-microscope 10, the specimen 13 to be viewed is initially positioned on the adjustable or manipulatable stage 12 and the light indicator device 16 is turned on to project the light spot 46 on the specimen. Of course, the light indicator assembly 16 preferably includes a conventional focusing arrangement for adjusting the size of the light spot 46 as desired. The microscopes 14 and 15 are then arranged to intersect each other with the optical axes of the two microscopes defining a plane in which the spot 46 is located. As is shown on FIGS. 3 and 4, the optical axes 49 and 50 of microscopes 14 and 15 enclose angles $a1$ and $a2$ with respect to the axis of the beam 44 and such angles $a1$ and $a2$ may be equal to each other. Then the specimen 13 is viewed through each of the microscopes 14 and 15. If the centers $A_1$ and $A_2$ of the fields of view of both microscopes 14 and 15 do not coincide, that is, if the light spot 46 does not appear at the center of the field of view of each microscope, then it is indicated that the two microscopes are not viewing the same portions of specimen 13. When this occurs, the stage 12 may be adjusted vertically, or the microscopes 14 and 15 may be moved together in the vertical direction, as by the gear and rack drive 23, until the point of intersection of the optical axes 49 and 50 is made to coincide with the top surface of stage 12 on which the specimen is supported. When that occurs, the light spot 46 and the intersection of the optical axes 49 and 50 will all coincide, as on FIG. 4. With such coincidence, the same region or portion of the specimen 13 will be viewed by both observers through microscopes 14 and 15, but with the directions of view being different by the sum of the angles $a1$ and $a2$.

It will be apparent that, by adjusting the stage 12 in the orthogonally related horizontal directions, the light spot 46 can be moved relatively to specimen 13 so as to point to or indicate various portions of the specimen. Thus, one observer can use the light spot to identify portions of the specimen to which reference is being made when teaching or instructing the other observer. If desired, the light indicator assembly 16 can be turned off, at any time, so that, after the light spot 46 has been used to identify a particular portion of the specimen, such light spot will not interfere with the observation of that portion.

In the above description, the specimen 13 and the microscopes 14 and 15 have been moved vertically relative to each other to cause coincidence of the fields of view of the microscopes at the plane of the specimen, but it is to be understood that the specimen 13 can be moved horizontally thereafter so as to permit observation of various areas of the specimen.

It is also to be understood that the plural-microscope 10 according to this invention is not limited in its use to permitting simultaneous viewing of a specimen or object by two observers. Alternatively, the microscope 10 can be used by a single person to permit the viewing of a particular portion of the specimen in different directions, for example, in the directions of the optical axes of the microscopes 14 and 15, whereby the observer will be apprised of the appearance of the specimen when viewed from such different directions.

It is also to be understood that a plural-microscope according to this invention may include more than the two illustrated microscopes 14 and 15.

Although an illustrative embodiment of this invention has been described in detail herein with reference to the accompanying drawing, it is to be understood that the invention is not limited to that precise embodiment, and that various changes and modifications may be effected therein by one skilled in the art without departing from the scope or spirit of the invention.

What is claimed is:

1. A plural-microscope comprising, a stand, a stage carried by said stand for supporting a specimen to be viewed, a body mounted on said stand, at least a pair of stereoscopic microscopes mounted on opposite sides of said body for the simultaneous stereoscopic viewing of a specimen on said stage, light indicator means carried by said body between said pair of microscopes and being operative to project onto said stage a spot of light which is substantially smaller than the field of view of each of said microscopes, and means for varying the relative distance between said stage and said microscopes to simultaneously position said light spot at the respective centers of the fields of view of each one of said pair of microscopes to identify a selected portion of a specimen to be stereoscopically viewed simultaneously in said microscopes.

2. A plural-microscope according to claim 1, in which said stage is movable relative to said stand in orthogonally related directions for varying the relative positioning of said light spot and said stage.

3. A plural-microscope according to claim 1, wherein said light indicator means includes color filter means for imparting a selected color to said light spot so that the latter can be readily distinguished from the overall illumination of the specimen.

4. A plural-microscope according to claim 3, in which said light indicator means includes a light source projecting a light beam toward said stage and condenser lens means to converge the light rays of said beam into said light spot, and in which said color filter means includes a plurality of differently colored filters, and a movable support carrying said filters for the disposition of a selected one of said filters across said light beam.

5. A plural-microscope according to claim 1, in which said microscopes are articulated on said body for varying the angles at which the optical axes of the microscopes converge toward said stage.

6. A plural-microscope comprising, a stand, a stage carried by said stand and having a horizontal surface for supporting a specimen to be viewed, a plurality of stereoscopic microscopes mounted on said stand for the simultaneous viewing of a specimen on said stage, each of said microscopes having a predetermined optical axis, said microscopes being mounted such that their optical axes intersect each other to define a plane parallel to said horizontal surface, light indicator means mounted on said stand and being operative to project onto said stage a spot of light which is substantially smaller than the field of view of each of said microscopes, means for effecting relative movement between said spot, said stage and said microscopes to position said spot in said plane which is parallel to said horizontal stage surface and which is located at the intersection of said optical axes of said microscopes, and means for varying the relative horizontal positioning of said light spot and said stage so that said light spot can be used to identify a selected portion of a specimen to be viewed simultaneously in said microscopes.

7. A plural-microscope according to claim 6, in which said stand includes a vertical post, a body carrying said light indicator means and having two of said microscopes disposed at opposite sides of said body, said means for effecting relative movement includes rack and gear means for mounting said body in a vertically adjustable manner on said post, and said microscopes are articulated on said body for varying the angles at which the optical axes of the microscopes converge toward said stage.

* * * * *